Patented June 25, 1935

2,006,016

UNITED STATES PATENT OFFICE 2,006,016

METHOD OF MAKING PIGMENTED PAPER

Alwin C. Eide and John Henry Calbeck, Columbus, Ohio, assignors to American Zinc, Lead & Smelting Company, St. Louis, Mo., a corporation of Maine No Drawing. Application July 31, 1934, Serial No. 737,856

25 Claims. (Cl. 92—21)

This invention relates to pigmented papers and more particularly to the method of making the same, and has for its object to produce paper of this kind in which the pigment is thoroughly and efficiently incorporated with the fibers of the paper at a reduced cost, and with improved color and opacity incident to the use of the pigment.

It has heretofore been the practice to incorporate zinc sulfide pigments in paper for the purpose of improving opacity and the weight of the paper, the zinc sulfide in recent years used for this purpose being of the calcined type. However, uncalcined or crude zinc sulfide pigments have been used primarily to give weight to the paper, but because such uncalcined pigments do not possess high opacity, they have been displaced by cheaper materials of equivalent opacity, such as blanc fixe.

In the present practice in the paper making art, white pigments are incorporated in paper primarily to improve the color and opacity, and it has been found that uncalcined zinc sulfides as heretofore prepared cannot be used successfully for this purpose. Moreover, crude (uncalcined) zinc sulfides as heretofore prepared are not only inferior in color and opacity to the calcined zinc sulfides but they have a harsh texture which makes them difficult to employ.

The amount of white pigment required to produce a desired opacity in the finished paper depends largely upon two factors; 1. Retention of the pigment by the paper fibers, and 2. The natural opacity or obscuring power of the pigment. In order that the cost of pigmentation may not be excessive, all or nearly all of the pigment added to the paper pulp should be retained by the finished paper and not washed out with the waste waters. This retention largely depends upon the extent to which the pigment is absorbed by the paper fiber, that is, the extent to which the paper fiber and the pigment particles cling together by mutual attraction. This absorptive property of zinc sulfide is largely reduced by calcining because of the physical changes taking place on the surface of the particles and because of the sintering together of many small particles to form aggregates, thereby reducing the active surface of the pigment.

Opacity or obscuring power of the pigment is largely a function of the refractive index of the particle and the particle size. Because of the exceptionally high refractive index of zinc sulfide it has been used extensively in the manufacture of pigments for paints. But heretofore it has not been found possible to prepare zinc sulfide pigment with good opacity without calcining. This made it impractical to use zinc sulfide in the undried or sludge form. The steps involved in drying and calcining zinc sulfide introduce additional costs and make a pigment that is less easily retained by the paper pulp.

A zinc sulfide precipitated slowly develops a crystalline rather than a colloidal structure, and therefore develops whitening strength. The method of this invention involves incorporating a wet crude zinc sulfide as precipitated, and not muffled, that has been so precipitated as to develop whitening strength before muffling. One method of making a high opacity zinc sulfide suitable for carrying out this invention is disclosed in the U. S. application of John H. Calbeck, Serial No. 688,413, filed September 6, 1933, resulting in a pigment of crystalline form of uniform size, and having a color strength, whiteness and brightness of unusual quality. Briefly stated, the process set forth in said application is as follows:

A zinc sulfate solution of about 28° Bé. is prepared and brought to boiling. A chemically equivalent volume of a thiosulfate (sodium or ammonium thiosulfate) is prepared of about 38° Bé. and purified of sulfite and sulfide. This solution is brought to boiling and a predetermined amount (300 mg. per liter) of sodium sulfide is added to provide a control of particle size. The two boiling solutions are rapidly mixed and vigorously agitated, and sodium carbonate or other alkali base (or ammonia) is slowly added to maintain a constant pH in the mixture. For the purpose of controlling the pH of said mixture, there is immersed therein electrodes of pure antimony and pure zinc connected by suitable wires to a potentiometer, and the base is added to the precipitation mixture at such a rate as to maintain the E. M. F. across the electrodes of about 700 mv. The boiling, agitation and addition of the base is continued until the reaction is complete. When complete, the mixture consists of a suspension of a basic hydrated zinc sulfide with a combined zinc oxide content of from 3% to 5% in a saturated solution of sodium sulfate (or other alkali or ammonium sulfate). The precipitate is filtered and washed free of the sulfate solution.

According to the present invention the wet (that is, undried) washed filtered cake or pulp is added in any required quantity to paper pulp in the pulp machine for incorporation in the paper. Pigmentation by this method results in a negligible loss of pigment in the waste water because of the high absorptive property and perfect dispersion of the undried precipitated pigment. Paper so produced has a wide range of opacities with a marked improvement in color, brightness and resistance to degradation.

The zinc sulfide produced by the above indicated method does not require muffling, since the desired particle size can be obtained at the time of precipitation over a range from very fine to coarse, but in order to obtain exceptionally high opacities it is sometimes desirable to dehydrate the zinc sulfide in the sense of removing all or part of the water of crystallization or absorbed $H_2O$ without actually drying or calcining. This can be done by heating the wet pulp under pressure. It has been found that this dehydration can be accomplished by heating to 200° C. to 350° C. under the corresponding steam pressure.

Instead of precipitating the zinc sulfide and then incorporating the wet washed filtered cake or pulp in the paper pulp, as set forth above, the process may be modified by mixing the wet sulfide precipitate in large quantities with a small quantity of paper pulp and then this paper pulp is in turn mixed with the paper pulp in a pulp machine. Furthermore, the zinc sulfate and alkali thiosulfate solutions may be added to the paper pulp as such, and the mixture boiled and maintained at a substantially constant pH by the continuous addition of a base until the reaction is complete; or, one of these solutions, either zinc sulfate or basic thiosulfate solution, may be added to the paper pulp and remain in contact therewith until a certain amount thereof is absorbed by the pulp, and then the other solution added and the mixture boiled while maintaining a substantially constant pH by the continuous addition of a base until reaction is complete. In this case a substantial amount of the zinc sulfide will be precipitated directly in the pulp and produce a better bond between it and the precipitated zinc sulfide.

Whatever may be the method employed for incorporating the zinc sulfide in the paper pulp while in a wet or undried condition, there results a superior bond between the precipitated zinc sulfide and the fibers of the pulp, and hence a very material saving in the zinc sulfide itself, since this intimate bond between the zinc sulfide and the pulp prevents the loss of the sulfide through the medium of the waste water.

While, for the purpose of describing the invention, certain examples of the method employed have been set forth in specific detail herein, it will be understood that various other modifications thereof may be practiced without departing from the spirit of the invention, and that such examples are not designed to define the limits of the invention, reference being had to the appended claims for this purpose.

Having thus described the invention, what is claimed is:

1. In a process of making pigmented paper, the step of incorporating undried zinc sulfide in the paper pulp.

2. In a process of making pigmented paper, the step of incorporating undried zinc sulfide having a combined zinc oxide content of from two of five percent in the paper pulp.

3. In a process of making pigmented paper, the step of incorporating undried zinc sulfide in the paper pulp by adding the same to the pulp under agitation.

4. In a process of making pigmented paper, the step of incorporating undried zinc sulfide having a combined zinc oxide content of from two to five percent in the paper pulp by adding the same to the pulp under agitation.

5. In a process of making pigmented paper, the step of incorporating undried zinc sulfide in the paper pulp by precipitating the sulfide in the presence of the pulp.

6. In a process of making pigmented paper, the step of incorporating undried zinc sulfide having a combined zinc oxide content of from two to five percent in the paper pulp by precipitating the same in the presence of the pulp.

7. In a process of making pigmented paper, the step of incorporating undried zinc sulfide in the paper pulp by incorporating the same in excess in a small amount of pulp and then adding this pulp-zinc-sulfide composition to the main body of the pulp.

8. In a process of making pigmented paper, the step of incorporating undried zinc sulfide having a combined zinc oxide content of from two to five percent in the paper pulp by incorporating the same in excess in a small amount of pulp and then adding this pulp-zinc-sulfide composition to the main body of the pulp.

9. In a process of making pigmented paper, the step of incorporating undried basic hydrated zinc sulfide in the paper pulp.

10. In a process of making pigmented paper, the step of incorporating undried basic hydrated zinc sulfide having a combined zinc oxide content of from two to five percent in the paper pulp.

11. In a process of making pigmented paper, the step of incorporating undried basic hydrated zinc sulfide in the paper pulp by adding the same to the pulp under agitation.

12. In a process of making pigmented paper, the step of incorporating undried basic hydrated zinc sulfide having a combined zinc oxide content of from two to five percent in the paper pulp by adding the same to the pulp under agitation.

13. In a process of making pigmented paper, the step of incorporating undried basic hydrated zinc sulfide in the paper pulp by precipitating the sulfide in the presence of the pulp.

14. In a process of making pigmented paper, the step of incorporating undried basic hydrated zinc sulfide having a combined zinc oxide content of from two to five percent in the paper pulp by precipitating the same in the presence of the pulp.

15. In a process of making pigmented paper, the step of incorporating undried hydrated zinc sulfide in the paper pulp by incorporating the same in excess in a small amount of pulp and then adding this pulp-zinc-sulfide composition to the main body of the pulp.

16. In a process of making pigmented paper, the step of incorporating undried basic hydrated zinc sulfide having a combined zinc oxide content of from two to five percent in the paper pulp by incorporating the same in excess in a small amount of pulp and then adding this pulp-zinc-sulfide composition to the main body of the pulp.

17. In a process of making pigmented paper, the step of incorporating undried basic zinc sulfide in the paper pulp by simultaneously adding a zinc sulfate solution and an alkali thiosulfate solution to the pulp.

18. In a process of making pigmented paper, the step of incorporating undried basic hydrated zinc sulfide having a combined zinc oxide content of from two to five percent in the paper pulp by simultaneously adding zinc sulfate solution and an alkali thiosulfate solution to the pulp.

19. In a process of making pigmented paper, the step of incorporating undried basic hydrated zinc sulfide in the paper pulp by preparing solutions of zinc sulfate, and an alkali thiosulfate and mixing one of these solutions with the pulp and then adding the other solution to the mixture.

20. In a process of making pigmented paper, the step of incorporating undried basic hydrated zinc sulfide having a combined zinc oxide content of from two to five percent in the paper pulp by preparing solutions of zinc sulfate, and an alkali thiosulfate and mixing one of these solutions with the pulp and then adding the other solution to the mixture.

21. A method of making pigmented paper including the precipitation of a basic hydrated zinc sulfide by mixing chemically equivalent quantities of boiling solutions of zinc sulfate and an alkali thiosulfate, boiling and adding a base at a rate to maintain a constant pH in the mix and when the reaction is complete adding the mixture to the paper pulp to incorporate the zinc sulfide therein.

22. A method of making pigmented paper including the precipitation of a zinc sulfide by mixing chemically equivalent qualities of boiling solutions of zinc sulfate and an alkali thiosulfate, boiling and adding a base at a rate to maintain a constant pH in the mix, and when the reaction is complete, washing the pigment free of soluble salts and adding it as a wet pulp to the paper pulp to incorporate the zinc sulfide therein.

23. A method of making pigmented paper including the precipitation of zinc sulfide by mixing boiling solutions of zinc sulfate and an alkali thiosulfate, boiling and adding a base at a rate to maintain a constant pH in the mix until the reaction is complete, washing the pigment free of soluble salts and treating the wet pulp with steam under pressures sufficient to maintain a temperature above 200° C. until a desired degree of dehydration of the pigment is accomplished, and then adding the treated pulp to the paper pulp to incorporate the zinc sulfide therein.

24. A method of adding zinc sulfide pigment to paper which includes the prepicitation of the zinc sulfide on a small portion of paper pulp and adding the required amount of this "master batch" to a larger quantity of paper pulp to incorporate the zinc sulfide therein.

25. A method of precipitating a zinc sulfide pigment in the presence of paper pulp which comprises adding a mixture of zinc sulfate and an alkali thiosulfate to a paper pulp, boiling the mixture and maintaining a substantially constant pH by the continuous addition of a base until the reaction is complete.

ALWIN C. EIDE.
JOHN HENRY CALBECK.